United States Patent [19]

Myers et al.

[11] Patent Number: 4,620,890
[45] Date of Patent: Nov. 4, 1986

[54] METHOD OF MAKING A FLUTED CORE RADOME

[75] Inventors: Donald H. Myers, Kent; James A. Lampman, Tacoma, both of Wash.

[73] Assignee: Hitco, Newport Beach, Calif.

[21] Appl. No.: 584,617

[22] Filed: Feb. 29, 1984

Related U.S. Application Data

[63] Continuation of Ser. No. 385,761, Jun. 7, 1982, abandoned.

[51] Int. Cl.⁴ .................................................. B31F 1/00
[52] U.S. Cl. ..................................... 156/196; 156/245; 156/285; 156/382; 264/292; 264/313; 264/320; 264/500; 343/909; 425/396; 425/403; 427/389.8
[58] Field of Search ............... 156/187, 196, 245, 285, 156/382, 448; 29/600; 343/912, 909; 264/313, 500, 512, 318, 320, 322, 292; 425/394, 396, 403; 427/389.8

[56] References Cited

U.S. PATENT DOCUMENTS

| | | | |
|---|---|---|---|
| 2,755,216 | 7/1956 | Lemons | 156/187 |
| 3,795,559 | 3/1974 | Horn et al. | 156/245 |
| 3,871,001 | 3/1975 | Myers | 343/909 |

OTHER PUBLICATIONS

"Law-Pressure Laminates for Aircraft", Dec. 1951, pp. 415-420, British Plastics, vol. 24.

Primary Examiner—Jay H. Woo
Assistant Examiner—Timothy W. Heitbrink
Attorney, Agent, or Firm—Bogucki, Scherlacher, Mok & Roth

[57] ABSTRACT

In a method of making a fluted core radome from resin impregnated glass cloth, an outer skin, a fluted core, an inner skin, an edge band and a drain cap are individually fabricated from plies of resin impregnated glass cloth which are laid up on a mold and then subjected to pressure using a vacuum bag and to resin curing heat using an autoclave. The fluted core is formed on a mold having recesses in the surface thereof by placing silicone rubber mandrels within the recesses and on top of the plies of glass cloth, the mandrels tending to expand in response to the application of heat thereto and at the same time tending to contract in response to the application of pressure thereto so that an equilibrium is reached which provides a tight fit of the glass plies over the mold and a relatively even flow of resin within the glass cloth. Assembly of the radome is accomplished by locating the outer skin within a female mold and thereafter bonding the core to the outer skin, the edge band to the outer skin, the drain cap to the core and the core to the inner skin in separate steps utilizing the application of adhesive followed by the application of pressure using a vacuum bag.

16 Claims, 18 Drawing Figures

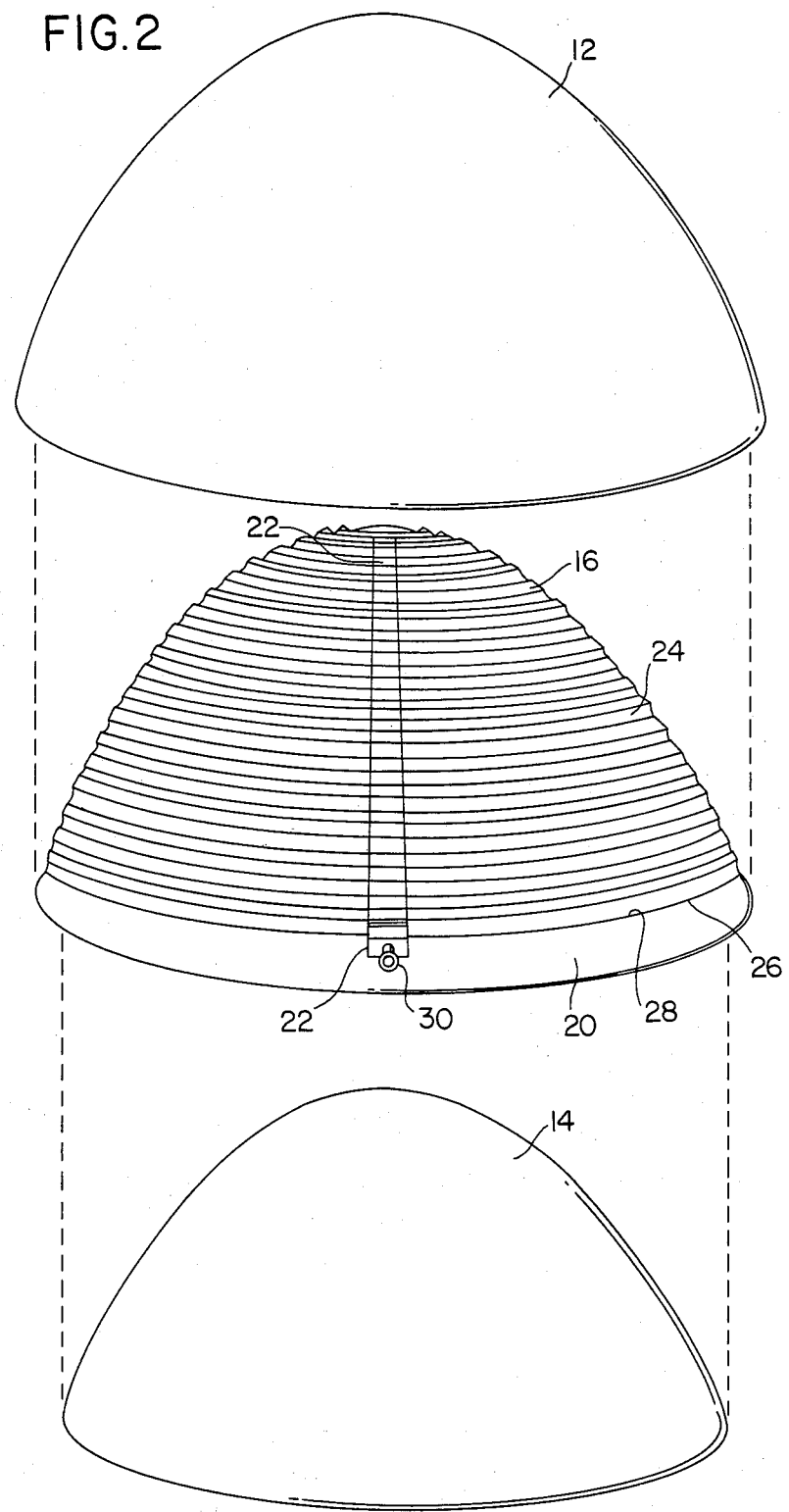

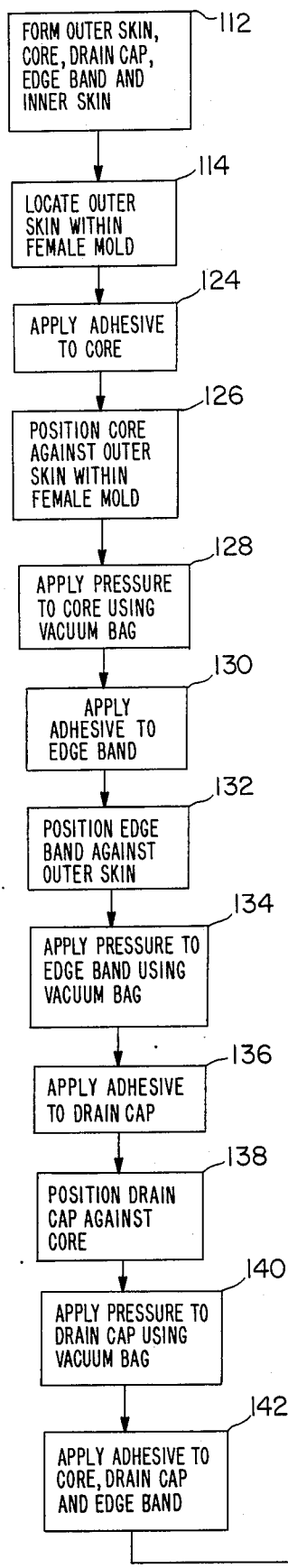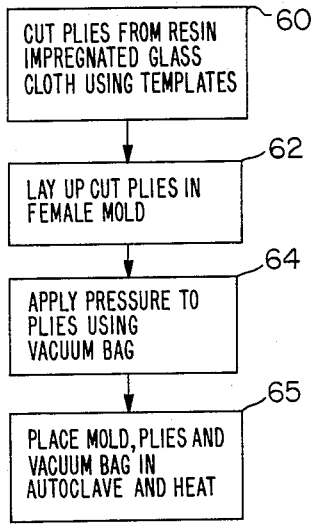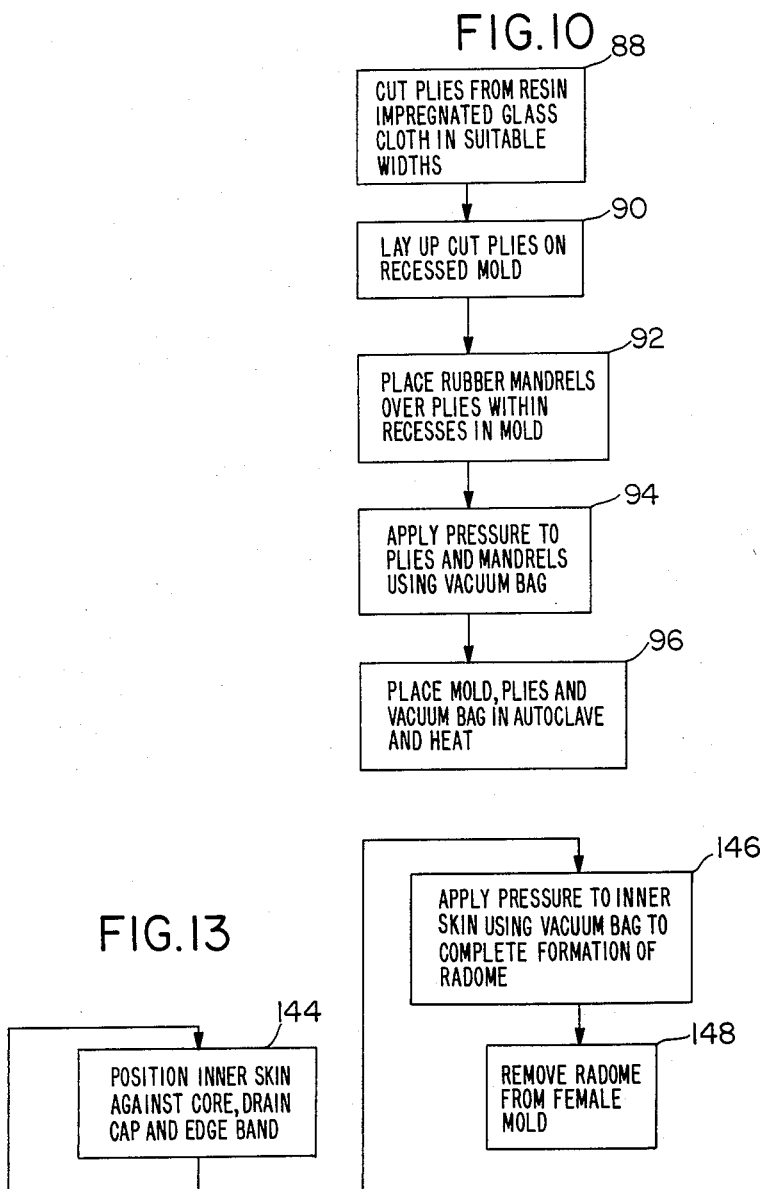

METHOD OF MAKING A FLUTED CORE RADOME

This is a continuation of application Ser. No. 385,761 filed June 7, 1982, now abandoned.

BACKGROUND OF THE INVENTION

1. Field of the Invention

The present invention relates to relatively rigid structures made from cloth impregnated with a thermosetting compound, and more particularly to radomes of the fluted core type made from resin impregnated glass cloth.

2. History of the Prior Art

Radomes and other structural members made from woven materials such as glass cloth which are impregnated with a thermosetting compound are widely known and used. Examples of such radomes are provided by U.S. Pat. No. 3,871,001 of Myers (commonly assigned with the present application), U.S. Pat. No. 3,795,559 of Horn et al and U.S. Pat. No. 2,755,216 of Lemons. Composite aircraft radomes of this type have been manufactured utilizing three basic types of construction which include solid laminate, conventional sandwich and fluted core sandwich.

Solid laminate radomes are typically made from glass or polyester cloth. Because plies of the material must be added to enhance the structural characteristics of the radome, the result is often excessive weight as well as poor transmission characteristics. Some improvements have been realized in solid laminate radomes through the utilization of filament winding to orient the fibers, reduce the required material and substantially reduce the hand labor costs. Nevertheless, the inherent disadvantages in radomes of this construction type remain.

Typical radomes of conventional sandwich construction have glass skins impregnated with epoxy or polyester resin and bonded to cores of glass honeycomb, polyurethane foam or syntactic foam. The advantages of such construction include low cost, high strength, low weight and good transmission characteristics. A principal disadvantage of such construction lies in the tendency of such radomes to absorb and retain water. This becomes a problem as commercial aircraft routinely pass through the dew point several times during a flight day. The moisture which collects within the radome repeatedly freezes and thaws when subjected to such conditions. This coupled with some icing on the outer skin results in reduced electrical transmission properties and blind spots. Eventually, the moisture may cause failure at the core-skin interface due to the repeated wedging action which occurs with freezing and thawing.

Radomes of fluted core sandwich construction have been constructed using a variety of techniques. One such technique involves the use of an integrally woven three-dimensional fabric designed and woven for a specific radome application. This technique has the advantages of high strength, provision for moisture removal and minimization of icing through use of warm air ducting. Disadvantages include high cost, greater manufacturing difficulty, reduced radar transmission efficiency, expensive repairs and lack of means for a definitive vertical web quality verification.

As noted the fluted and honeycomb core radome constructions have a number of highly desirable features along with the disadvantages thereof. It would therefore be desirable to have available a new method of radome construction enjoying the advantages of the desirable features of both such methods while at the same time reducing cost, weight and some of the other disadvantages attendant in such constructions. Much of the high cost is attributable to high materials cost as well as extensive hand labor. Unitized web construction makes rejects a significant factor. Weight is related to the fabrication method and the design to achieve the necessary transmission characteristics. It is frequently necessary to add a second layer of fluted structure at predetermined angles to cancel a focusing effect caused by a web restricted flute orientation. Additional weight problems are often caused by the fiber weight used to achieve the integrally woven three-dimensional fabric, the variable resin content which results from a wet lay-up impregnation and the additional skins required to tie adjoining strips of three-dimensional fabric together.

BRIEF DESCRIPTION OF THE INVENTION

Methods of making radomes in accordance with the invention initially fabricate the various component parts of the radome individually. These parts include outer and inner skins, a fluted core which is eventually sandwiched between the skins, an edge band which is sandwiched between the skins at the base of the radome and a drain cap which facilitates the drainage of moisture from the interior of the radome. Each such component is separately tooled, fabricated and cured. This allows proper pressures on the flutes of the core, for example, to achieve maximum strength.

The outer skin is formed by cutting out plies of resin impregnated glass cloth using templates and then laying up the plies within a female mold. The mold and plies are then placed within a vacuum bag to apply pressure to the plies while the resulting arrangement is placed in an autoclave and heated to at least partially cure the resin in the plies. The outer skin so formed may be allowed to remain within the female mold in preparation for subsequent assembly of the various individual parts of the radome. The inner skin is made in similar fashion using a male mold of slightly smaller dimensions on which the plies of glass cloth are laid up.

The fluted core is made by cutting plies of the resin impregnated glass cloth so as to have an appropriate width, and then laying the plies on the outer surface of a mold having a plurality of recesses or grooves in such outer surface. Rubber mandrels are then placed within the recesses and onto the portions of the plies within the recesses. The mold with cloth plies and rubber mandrels is then placed within a vacuum bag and the bag is evacuated to apply pressure to the mandrels and to the exposed portions of the plies. The entire assembly is then placed within an autoclave and heated. The glass cloth plies are arranged on the mold so that the warp of the cloth will not resist the pressure of the rubber mandrels. The pressure exerted on the mandrels is transmitted to the face of the cloth, and the warp of the cloth is displaced laterally until total contact between the cloth and the face of the mold is achieved. The heat from the autoclave causes the resin which is impregnated within the cloth plies to soften and flow. Eventually, a stabilized condition is achieved in which the rubber mandrels tend to contract when further pressure is applied and to expand when additional heat is applied. This provides a uniform application of pressure to the cloth. At the same time the flow of resin within the cloth is controlled so that voids are minimized or eliminated and a matching of the resulting cured fiberglass laminate to the face of the mold is achieved. After the resin has been at least partially cured, the heat and pressure are removed and the core is removed from the face of the mold.

The edge band and drain cap are made from plies of the resin impregnated glass cloth which are laid up in an appropriate manner and then subjected to pressure and heat.

With the outer skin remaining in the female mold in which it was fabricated and in accordance with one method of assembling the components fabricated as previously described, the core is bonded to the outer skin by applying adhesive to appropriate portions of the core and then placing the core in contact with the outer skin within the mold. Pressure is applied to the core by placing the mold together with the inner skin and core within a vacuum bag and evacuating the bag for a selected length of time. Following bonding of the core to the outer skin, the edge band is then bonded to the outer skin by applying adhesive to the edge band and placing it in contact with the outer skin adjacent the core and within the mold. The resulting assembly is again placed within a vacuum bag and pressure is applied to the edge band. Next, adhesive is applied to the drain cap which is then placed in contact with the core and the vacuum bag applied to apply pressure to the drain cap. Adhesive is then applied to exposed portions of the core, the drain cap and the edge band, and the inner skin is placed in contact therewith. Pressure is applied to the inner skin using the vacuum bag. When the adhesive has thoroughly dried, an integral radome is formed and may be removed from the female mold for trimming and other final processing.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 2 is an exploded view of the radome of FIG. 1 showing the basic components thereof;

FIG. 7 is a block diagram of the successive steps employed in making the inner and outer skins, the edge band and the drain cap of the radome of FIG. 1;

FIG. 10 is a block diagram of the successive steps employed in making the core of the radome of FIG. 1;

FIG. 13 is a block diagram of the successive steps employed in assembling the inner and outer skins, the core, the edge band and the drain cap to form the completed radome.

DETAILED DESCRIPTION

Figure 1:
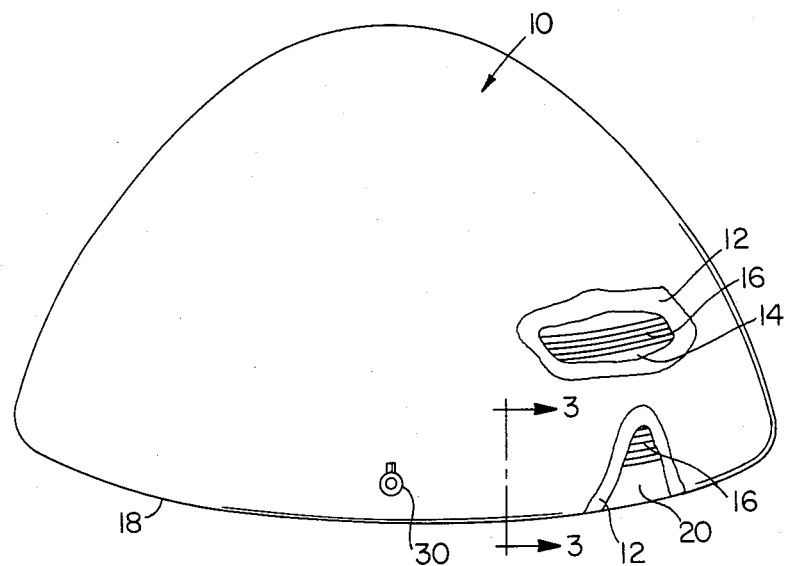
FIG. 1 is a perspective view of a radome made by methods in accordance with the invention.

FIG. 1 depicts a radome 10 made by methods in accordance with the invention. The radome 10 which is of conventional dome-shaped, aircraft configuration includes an outer skin 12 and an inner skin 14 sandwiching a fluted core 16 therebetween. Positioned between a base 18 of the radome 10 and the fluted core 16 is an edge band 20. A portion of a drain cap 22 adjacent the base 18 provides for the drainage of moisture from the interior of the radome 10 as described hereafter.

Substantially all of the radome 10 is constructed of epoxy resin impregnated glass cloth. As described hereafter the individual parts of the radome 10 are made from cut plies of the glass cloth which are laid up and then subjected to pressure and heat to cure the epoxy resin. The individual parts are then bonded to each other using adhesive and pressure to form the completed, integral radome 10 shown in FIG. 1 as described hereafter.

As used herein the term cloth denotes any of various types of thin, planar, flexible materials which are capable of impregnation with a resih system. The term includes both woven materials and similar materials of non-woven composition which are sometimes referred to in the art as glass substrates or precursors.

The nature of the component parts of the radome 10 and the manner in which they fit together can be better understood with reference to the exploded view of FIG. 2. The outer skin 12 is as shown in FIG. 1 and is comprised of a thin shell of fiberglass of relatively uniform thickness. The inner skin 14 is of similar shape and construction but is slightly smaller in size than the outer skin 12. As described hereafter the outer and inner skins 12 and 14 are made by laying up cut plies of the epoxy resin impregnated glass cloth on a mold followed by the application of pressure and heat to soften and then cure the resin. The fluted core 16 is formed in similar fashion but using a mold having a plurality of recesses therein. As described hereafter silicon rubber mandrels are placed within the recesses prior to the application of pressure and heat in order to form a plurality of flutes 24 within the core 16. The core 16 has a lower edge 26 which abuts a top edge 28 of the edge band 20. The edge band 20 encircles the core 16 at the lower edge 26 thereof. The drain cap 22, which in the present example is disposed on the outside of the core 16 as shown in FIGS. 2, 5 and 6, but which may alternatively be mounted on the inside of the core 16 as described hereafter, extends from the lower edge 26 of the core 16 to the top of the core 16 and has a drain fitting 30 at the lower end thereof which is completely visible in FIG. 2 and which is partly visible in FIG. 1.

Figure 3:
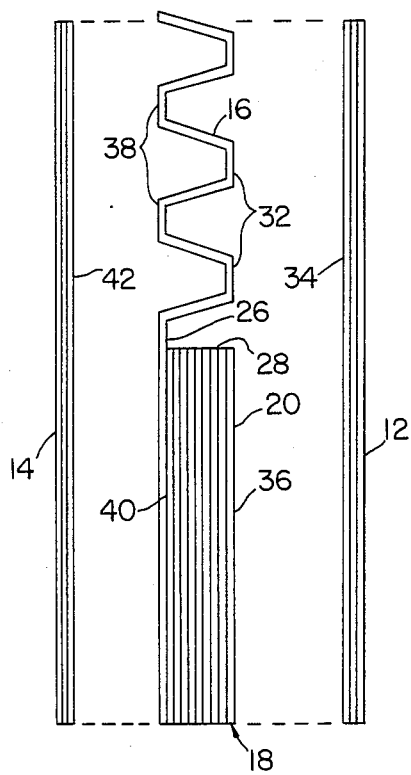
FIG. 3 is an exploded sectional view of a portion of the radome of FIG. 1 taken along the line 3—3 thereof.

FIG. 3 illustrates the manner in which the edge band 20 interfaces with the core 16, the outer skin 12 and the inner skin 14. The skins 12 and 14 are shown spaced apart from the core 16 and the edge band 20 in FIG. 3 to illustrate the component parts of the resulting sandwich in spaced-apart relation. As described hereafter, the radome 10 is assembled by bonding surfaces 32 of the core 16 to an inner surface 34 of the outer skin 12. This is followed by the bonding of a surface 36 of the edge band 20 to the inner surface 34 of the outer skin 12. Following that, opposite surfaces 38 of the core 16 and 40 of the edge band 20 are bonded to a surface 42 of the inner skin 14.

Figure 5:
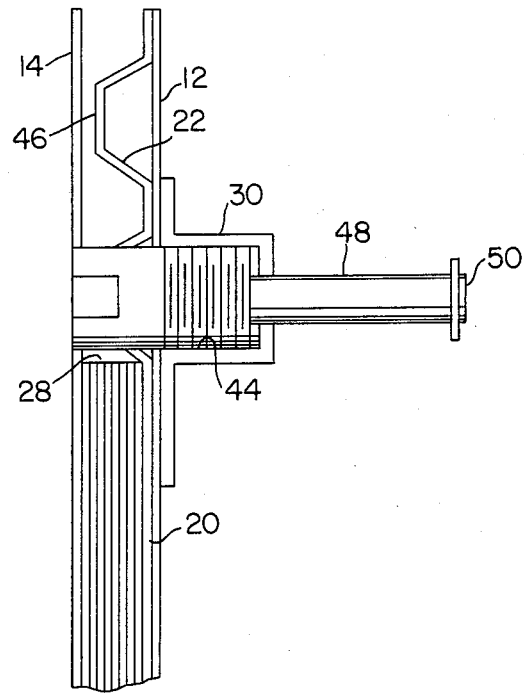
FIG. 5 is a sectional view of the portion of the radome shown in FIG. 4 taken along the line 5—5 thereof.
Figure 4:
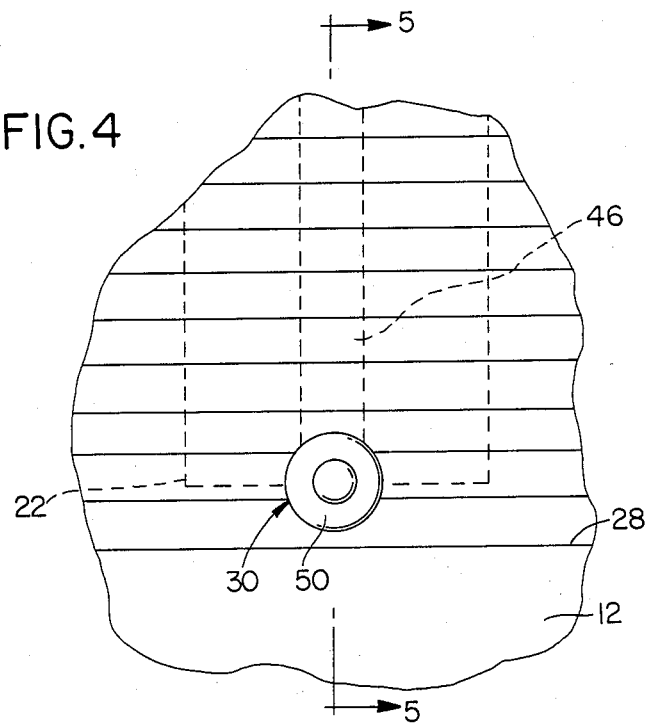
FIG. 4 is a plan view of a portion of the radome of FIG. 1 showing the drain cap assembly.
Figure 6:
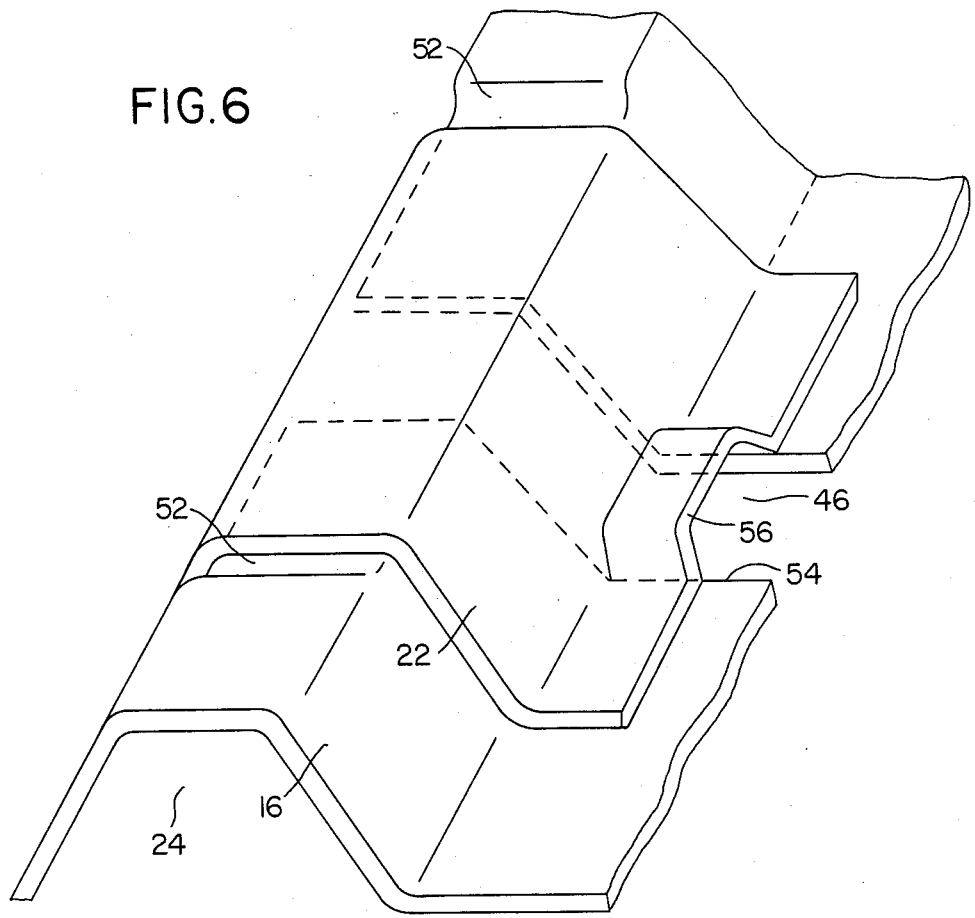
FIG. 6 is a perspective view of a small portion of the core of the radome of FIG. 1 illustrating a portion of the drain cap assembly installed thereon.

FIGS. 4-6 illustrate the details of the drain cap 22 and drain fitting 30. The drain fitting 30 resides against a portion of the top edge 28 of the edge band 20 and extends into contact with the core 16. The drain fitting 30 has a hollow interior 44 thereof communicating with a small passage 46 extending from the top to the bottom of the core 16 and formed by the drain cap 22. The hollow interior 44 of the drain fitting 30 also communicates with a short length of conduit 48 having an outer end which terminates in a conduit cover 50. The hollow interior 44 couples the passage 46 to the conduit 48 so that moisture which appears at the passage 46 is drained from the interior of the radome 10.

The various flutes 24 within the core 16 form a series of passages which extend around the radome 10. Means (not shown) can be provided to circulate warm air through the flutes or passages to prevent ice from accumulating on the outer skin 12 in well known fashion. In addition, moisture may accumulate and build up within the passages. This moisture flows to the passage 46 formed by the drain cap 22 from which it flows through the passage 46 and the hollow interior 44 of the drain fitting 30 for removal from the radome 10 via the conduit 48.

The nature of the passage 46 can be better understood with reference to FIG. 6. It was previously pointed out in connection with FIG. 2 that the drain cap 22 extends from the lower edge 26 of the core 16 to the top of the core 16. Prior to installation of the drain cap 22 on the core 16, a portion of the top of each flute 24 of the core 16 is cut away to provide a recess 52. In addition a slot 54 is cut in the core 16 so as to extend from the lower edge 26 of the core to the top of the core. The drain cap 22 is then bonded to the core 16 by applying adhesive followed by the application of pressure as described hereafter. The drain cap 22 fits within the recesses 52 at the tops of the flutes 24 of the core 16 so as not to interfere with the bonding contact between the outer skin 12 and the core 16. Central portions of the drain cap 22 such as a portion 56 shown in FIG. 6 are raised so as to provide the passage 46 together with the slot 54.

FIG. 7 depicts the successive steps in making the outer skin 12. In a first step 60 plies of resin impregnated glass cloth are cut using templates. In a next step 62 the cut plies are laid up within a female mold. Following that and in a next step 64 pressure is applied to the plies by placing the mold with plies in a vacuum bag and evacuating the bag. At the same time as the pressure is applied to the plies, the plies are heated to an appropriate temperature for an appropriate period of time to soften and then substantially cure the resin in a further step 65. This is accomplished by placing the vacuum bag which contains the mold and the plies of cloth in an autoclave. In a typical example according to the invention, a pressure of approximately 50 psi is applied to cut plies of style 181 or style 120 glass cloth impregnated with epoxy resin while the plies are heated at a temperature of approximately 250° F. for a period of approximately 90 minutes.

Figure 8:
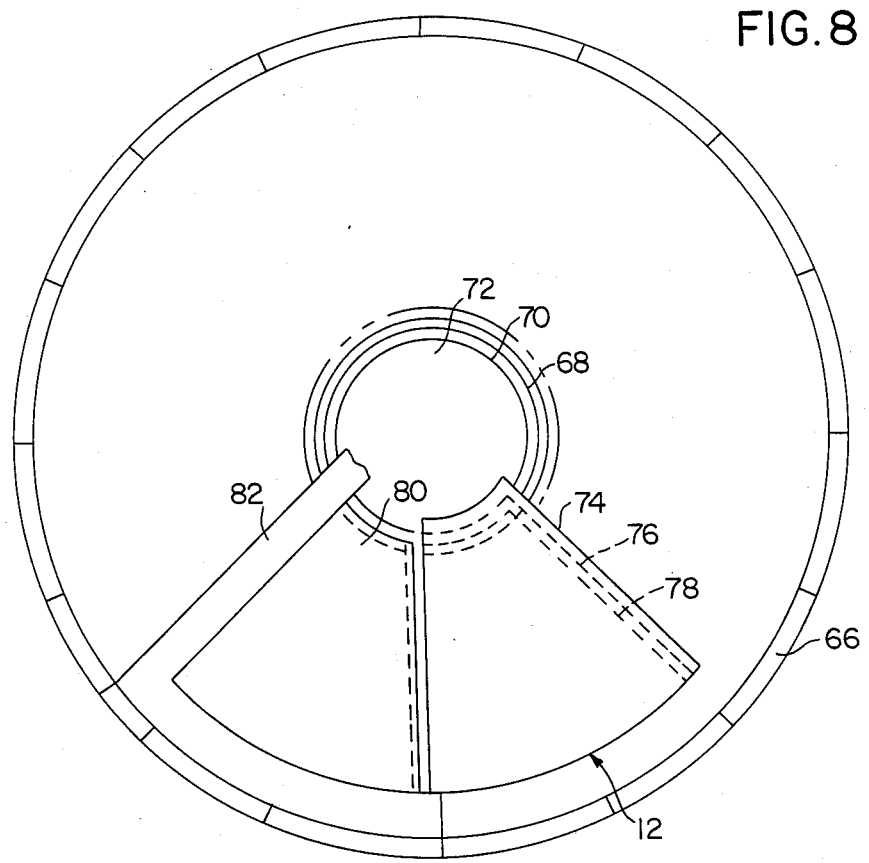
FIG. 8 is a plan view of the inside of a female mold showing the manner in which cloth plies are laid up therein to form the outer skin.

FIG. 8 illustrates the manner in which the cut plies are laid up within a female mold 66 during formation of the outer skin 12. Three different nose plies 68, 70 and 72 of generally circular configuration are shown disposed at the center of the inside of the dome formed by the mold 66. Three side plies 74, 76 and 78 have been placed so as to partially overlap each other as well as the nose plies 68, 70 and 72. An additional side ply 80 has been placed so as to overlap the nose ply 68 and the side ply 78. Each of the side plies 74, 76, 78 and 80 extends around approximately one-eighth the circumference of the mold 66. A trimming template 82 is shown placed over the side ply 80 and is used to trim the various side plies to the desired size and configuration as the side plies are laid up within the mold 66. Additional side plies are laid up within the mold 66 and trimmed as appropriate using the trimming template 82 until the entire circumference of the mold 66 is covered with a desired lay up of glass cloth plies. The mold 66 with the various plies laid up therein is then placed within a vacuum bag and a thin layer of separating material is placed between the plies and the bag to keep the bag from sticking to the plies. The vacuum bag is evacuated to apply pressure to the plies and to hold the plies in place against the inner surface of the mold 66. Heat is applied by an autoclave in the manner previously described so as to soften and then cure the resin within the plies and thereby form the completed, integral outer skin 12. The formed outer skin 12 may be allowed to remain within the mold 66 pending final assembly of the radome parts as described hereafter in connection with FIGS. 13-18. Alternatively, the formed outer skin 12 may be removed from the mold 66 and thereafter again placed within the mold 66 or a similar female mold in preparation for assembly of the various parts to form the completed radome 10.

As previously noted the inner skin 14 has a shape similar to that of the outer skin 12 and is slightly smaller in size. The inner skin 14 is formed in a manner similar to that in which the outer skin 12 is formed as just described. A male mold slightly smaller in size than the female mold 66 shown in FIG. 8 is used in the formation of the inner skin 14. The inner skin 14 is formed by laying up cut plies on the outside of the male mold. Thereafter the mold with laid up plies is vacuum bagged and heated in an autoclave in the same manner as in the formation of the outer skin 12.

Figure 9:
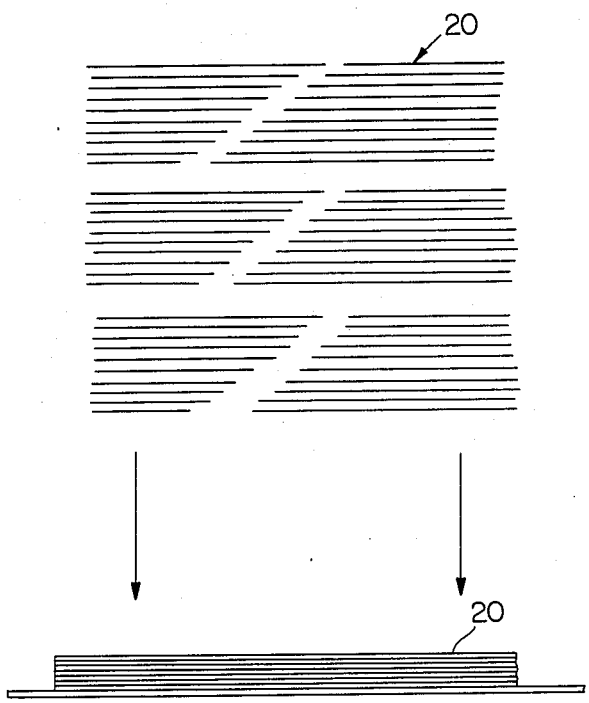
FIG. 9 is an exploded view of a plurality of cloth plies illustrating the manner in which they are assembled to form the edge band.

FIG. 9 is an exploded view showing the construction of the edge band 20. As shown in FIG. 9 the edge band 20 is comprised of approximately 30 plies of resin impregnated glass cloth. There are three groups of plies with 10 plies in each group. The plies within each group of 10 are actually comprised of two plies the mating edges of which abut each other along lines which are staggered throughout the thickness of the edge band 20 as shown in FIG. 9. The stack of 30 plies as shown in FIG. 9 is placed within a mold or other appropriate retaining structure during vacuum bagging and heating in an autoclave to apply pressure and heat to the stack of plies sufficient to soften and then cure the resin within the plies.

FIG. 10 depicts the successive steps in the method of making the fluted core 16. In a first step 88 plies are cut from resin impregnated glass cloth. The plies must be cut in suitable widths so as to extend over a mold used in the process of making the core 16. In a next step 90 the cut plies are laid up on a mold having recesses in the outer surface thereof. In a following step 92 silicone rubber mandrels are placed within the recesses in the mold and over those portions of the cut plies residing within the recesses. In a following step 94 the mold together with the cut plies and the mandrels is placed within a vacuum bag which is then evacuated to apply pressure to the mandrels and to the exposed portions of the cut plies. In a final step 96 the vacuum bag containing the mold, cut plies and mandrels is placed within an autoclave and heat is applied to soften and then substantially cure the resin in the plies.

Figure 11:
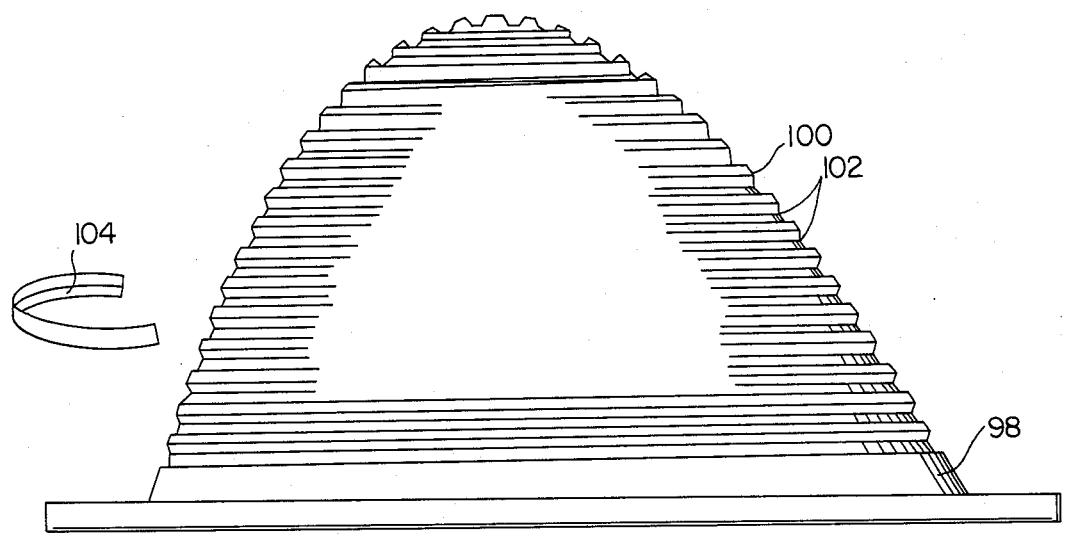
FIG. 11 is a side elevation of a mold used in making the core.

FIG. 11 depicts a mold 98 used in making the fluted core 16. It will be seen that the mold 98 has an outer surface 100 thereof having a series of recesses 102 therein extending around the circumference of the mold 98. The plies of resin impregnated glass cloth are cut and laid up on the outer surface 100 of the mold 98 so as to cover such outer surface with a generally uniform thickness of cloth plies. Prior to placing the mold 98 and the cut plies within a vacuum bag, silicone rubber mandrels such as the mandrel 104 shown in FIG. 11 are placed within the recesses 102 and on top of the portions of the cut plies within such recesses.

Figure 12:
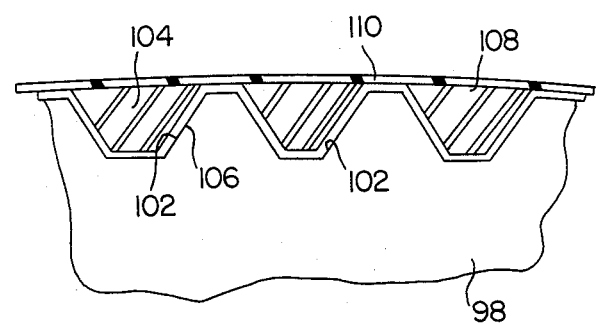
FIG. 12 is a sectional view of a small portion of the mold of FIG. 11 showing plies of glass cloth and silicone rubber mandrels in place during the formation of the core.

FIG. 12 shows a portion of the mold 98 with cut cloth plies 106 laid up thereon and extending into the various recesses 102. The silicon rubber mandrels such as the mandrel 104 are configured so as to generally conform with and force the plies 106 against the walls of the recesses 102 within the mold 98. A thin layer of separating material 108 is placed on top of the mandrels 104 and the plies 106 before a vacuum bag 110 is placed upon the entire assembly and evacuated to apply pressure to the mandrels 104 and the exposed portions of the plies 106.

Previously referred to U.S. Pat. No. 3,795,559 of Horn recognizes the advantages of silicone rubber mandrels. Silicone rubber does not stick to most surfaces, even in the presence of substantial pressure and heat. It deforms under pressure so as to fill a cavity and evenly distribute the pressure such as when used as a mandrel. These advantages and others are utilized in accordance with the invention in the formation of the fluted core 16. The plies of glass cloth are cut in suitable widths so that the warp of the cloth when applied to the mold 98 will not resist the pressure of the rubber mandrels 104. When the vacuum bag 110 is evacuated, pressure is applied to the mandrels 104 which in turn force the plies of cloth into contact with substantially all portions of the recesses 102 within the mold 98. When the vacuum bag 110 containing the mold 98 and the plies of cloth is then placed within the autoclave and heated, the resin impregnated into the plies of cloth begins to soften and flow. As the application of pressure and heat to the silicone rubber mandrels 104 continues, a stabilized or equilibrium condition is eventually reached in which the mandrels 104 tend to contract with the application of pressure and at the same time tend to expand with the application of heat. The presence of such stabilized condition insures the uniform application of pressure to the plies of glass cloth and control of the flow of resin in the cloth. As a result the problem of resin voids is substantially reduced or eliminated and the eventual cured fiberglass laminate closely matches the surface of the mold 98.

Figure 14:
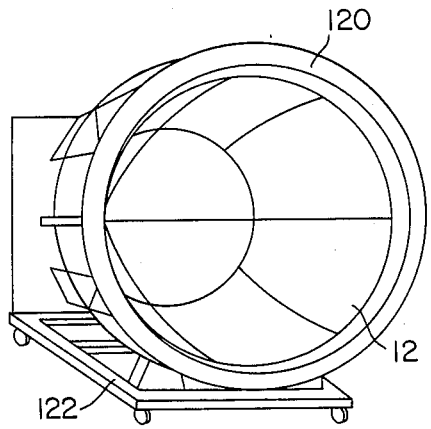
FIGS. 14–18 are different perspective views of a female mold illustrating some of the steps of FIG. 13 being performed.

FIG. 13 depicts the successive steps employed in one method of assembling the outer skin 12, the inner skin 14, the fluted core 16, the edge band 20 and the drain cap 22 into the completed radome 10. As noted in a first step 112, these components are made in the manner just described. In a following step 114 the outer skin 12 is located within a female mold. It was previously noted in connection with FIG. 8 in which use of the female mold 66 in the formation of the outer skin 12 is described that the formed outer skin 12 can simply be allowed to remain within the mold 66. In that event the mold 66 is used in the assembly of the various components into the completed radome 10. Alternatively, the outer skin 12 may be formed in a mold such as the mold 66 and then removed and subsequently placed in a different mold for purposes of assembling the radome 10. FIG. 14 depicts the formed outer skin 12 as having been located within a female mold 120. The mold 120 may comprise the mold 66 of FIG. 8 or it may comprise a different mold. The female mold 120 is shown in FIGS. 14–18 as being mounted on a castored mold stand 122.

Figure 15:
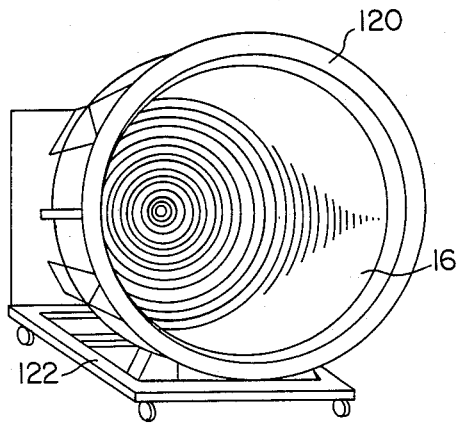

In a next step 124 shown in FIG. 13 adhesive is applied to the portions of the fluted core 16 which contact the outer skin 12 when the radome 10 is assembled. The portions to which the adhesive is applied include the contacting surfaces such as the surfaces 32 shown in FIG. 3. The adhesive may be of the epoxy ambient type or the low elevated temperature cure type and in the present example comprises a two part epoxy polyamid. Following application of the adhesive to the core 16, the core 16 is positioned against the outer skin 12 within the mold 120 as shown in FIG. 15. This action comprises a step 126 shown in FIG. 13. With the core 16 so positioned, pressure is applied to the core 16 to maintain the core in contact with the outer skin 12 while the adhesive sets. This action which is shown as a step 128 in FIG. 13 is preferably carried out by placing a vacuum bag such as the bag 110 over the mold 120 and the core 16. Evacuation of the vacuum bag collapses the bag onto the core 16 to apply pressure to the core 16. The pressure is maintained so as to hold the core 16 in tight contact with the outer skin 12 until the adhesive has set. In this manner the fluted core 16 is securely bonded to the outer skin 12.

In a next step 130 shown in FIG. 13 adhesive is applied to the edge band 20. In a following step 132 the edge band 20 is positioned against the outer skin 12 within the mold 120. The adhesive is applied to the surface 36 of the edge band 20 which is shown in FIG. 3 so that the edge band 20 may be bonded to the inner surface of the outer skin 12. In a following step 134 pressure is applied to the edge band 20 so as to hold the edge band 20 in close contact with the outer skin 12 until the adhesive has set. This may be accomplished by placing the vacuum bag over the mold 120 and evacuating the bag so as to collapse it onto the edge band 20 as well as the core 16.

In a following step 136 shown in FIG. 13 adhesive is applied to the drain cap 22 and in a next step 138 the drain cap 22 is positioned against the core 16 within the mold 120. This is an alternative construction according to the invention in which the drain cap 22 is mounted on the inside rather than on the outside of the core 16 as in the case of the embodiment shown in FIGS. 2, 5 and 6. The drain cap 22 is positioned against the inside of the core 16 in a position generally as shown in FIGS. 2 and 6. In a following step 140 pressure is applied to the drain cap 22 to hold the drain cap 22 in close contact with the core 16 while the adhesive sets. Once again, this may be accomplished by placing the vacuum bag over the mold 120 and collapsing it onto the drain cap 22 as well as the other parts.

Figure 16:
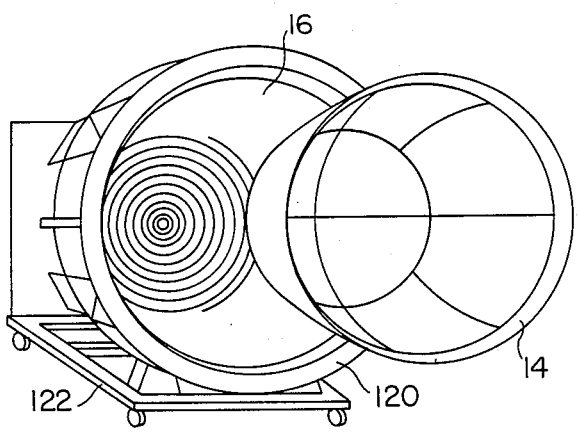
Figure 17:
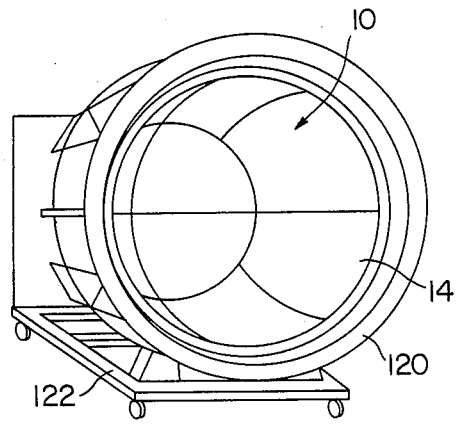

In a next step 142 shown in FIG. 13, adhesive is applied to portions of the core 16, the drain cap 22 and the edge band 20 which contact the inner skin 14 when the radome 10 is assembled. Referring to FIG. 3, adhesive is applied to the surfaces 38 of the fluted core 16 and to the surface 40 of the edge band 20. Adhesive is applied to those portions of the drain cap 22 shown in FIG. 6 which contact the inner skin 14. Alternatively, adhesive can be applied to the outer surface of the inner skin 14. In a next step 144 shown in FIG. 13 the inner skin 14 is positioned against the core 16, the edge band 20 and the drain cap 22 and, in a next step 146 pressure is applied to the inner skin 14 to hold it in contact with the core 16, the edge band 20 and the drain cap 22 while the adhesive sets. FIG. 16 illustrates the step 144 in which the inner skin 14 is positioned against the core 16, the edge band 20 and the drain cap 22 within the mold 120. The step 146 of applying pressure may again be carried out by placing the vacuum bag over the mold 120 and collapsing it onto the inner skin 14. When the adhesive has set, the vacuum bag is removed revealing the completed radome 10 within the mold 120 as illustrated in FIG. 17.

Figure 18:
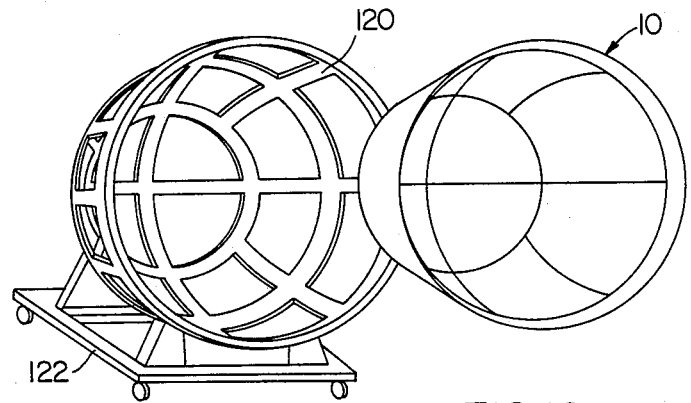

In a final step 148 shown in FIG. 13 the completed radome 10 is removed from the mold 120. This action is illustrated in FIG. 18. The drain fitting 30 together with the conduit 48 and the conduit cover 50 are installed in the radome 10 by drilling a hole through the entire thickness of the radome 10 including the outer and inner skins 12 and 14 at the lower end of the drain cap 22 just above the edge band 20. The assembly comprised of the drain fitting 30, the conduit 48 and the conduit cover 50 is inserted in the hole and is glued in place using adhesive so as to assume the position shown in FIG. 5. The radome 10 may be trimmed and otherwise treated as necessary in preparation for testing and installation in an aircraft.

Fluted core radomes made in accordance with the invention have been determined to have a cost comparable to that of the radomes of conventional sandwich type construction and substantially less than that of radomes of conventional fluted core sandwich construction. The weight of radomes made in accordance with the invention is approximately 7% less than the weight of radomes of conventional sandwich type construction. The X-band transmission efficiency of radomes made in accordance with the invention has been determined to be greater than in the case of radomes of conventional sandwich type construction.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of making a generally dome-shaped structure from resin impregnated cloth comprising the steps of:
   separately forming an outer skin, an inner skin and a core which are generally dome-shaped from resin impregnated cloth by applying pressure and heat to plies of the cloth arranged into desired configuations in separate operations;
   locating the formed outer skin within a generally dome-shaped female mole;
   applying adhesive to selected portions of an outer surface of the formed core;
   positioning the formed core against the formed outer skin within said dome shaped female mold;
   applying pressure to the formed core;
   applying adhesive to selected portions of an inner surface of the formed core;
   positioning the formed inner skin against the formed core within said dome shape female mold;
   applying pressure to the formed inner skin; and
   removing the formed outer skin, the formed core and the formed inner skin from said dome shaped female mold.

2. The method set forth in claim 1, wherein the steps of applying pressure to the core and applying pressure to the inner skin are carried out using a vacuum bag placed over the female mold and the core and the inner skin respectively.

3. The method set forth in claim 1, wherein the cloth comprises glass cloth impregnated with a thermosetting resin.

4. The method set forth in claim 1, wherein the formed outer skin and the formed inner skin are each formed in separate operations by by laying up plies of the resin impregnated cloth on a dome shaped male mold, applying pressure to the plies, heating the plies during the application of pressure thereto to at least partially cure the resin in the plies and form the skin, and removing the formed skin from the said dome shaped male mold.

5. The method set forth in claim 4, wherein the formed core is formed by laying up plies of the cloth in a dome shaped male mold having recesses therein, placing rubber mandrels within the recesses and over the portions of the plies within the recesses, applying pressure to the rubber mandrels, and heating the plies and the rubber mandrels during the application of pressure to the rubber mandrels to at least partially cure the resin in the plies.

6. The method set forth in claim 5, wherein the step of applying pressure to the rubber mandrels is carried out using a vacuum bag which surrounds the mold, the plies and the rubber mandrels, and the step of heating the plies and the rubber mandrels is carried out in an autoclave into which the vacuum bag containing the mold, the woven material and the rubber mandrels is placed.

7. The method of making a radome from resin impregnated glass cloth comprising the steps of:
   separately forming an outer skin, an inner skin and a core which are generally dome shaped from resin impregnated glass cloth by applying pressure and heat to plies of said cloth arranged into desired configurations in separate operations, the formed core having a plurality of flutes therein;
   locating the formed outer skin within a mating dome shaped female mold;
   bonding the formed core to the inside of the formed outer skin within said dome shape female mold using adhesive and pressure;
   bonding the formed inner skin to the inside of the formed core within said dome shaped female mold using adhesive and pressure; and
   removing the formed outer skin, the formed core and the formed inner skin from said dome shaped female mold.

8. The method set forth in claim 7, wherein forming the formed core comprises the steps of providing a dome shaped mold having a plurality of flute-forming recesses in the suffface thereof, placing plies of resin impregnated glass cloth over the surface of said dome shaped male mold and within the recesses in the surface, placing rubber mandrels over the plies of glass cloth and within the recesses, applying pressure to the mandrels, heating the plies of the mandrels during the application of pressure to th mandrels to at least partially cure the resin in the plies of glass cloth, removing the rubber mandrels from the plies of glass cloth, and removing the plies of glass cloth from said dome shaped male mold.

9. The method set forth in claim 7, including the further and separate steps of forming an edge band and a drain cap from resin impregnated glass cloth by applying pressure and heat to plies of the cloth arranged into desired configurations in separate operations, bonding the edge band to the inside of the formed outer skin within said dome shaped female mold using adhesive and pressure following the bonding of the formed core to the inside of the formed outer skin, cutting a slot in the formed core following formation of the formed core and bonding the drain cap to the formed core in the region of the slot using adhesive and pressure following formation of the formed core.

10. The method of making a radome from resin impregnated glass cloth comprising the steps of:
laying up plies of resin impregnated glass cloth on a dome shaped male mold;
placing said dome shape male mole and said plies in a vacuum bag to apply pressure to the plies;
heating said vacuum bag, the mold and the plies in an autoclave to at least partially cure the resin in said plies to form an outer skin;
repeating the aforementioned steps in a separate operation using a second dome shaped male mold smaller than the first-mentioned dome shaped male mold to form an inner skin;
laying up plies of resin imperngated glass cloth on a dome shaped recessed male mold having recesses;
placing mandrels over said plies and within the recesses in said dome shaped recessed male mold;
placing said dome shaped recessed male mold, said mandrels and said plies in a vacuum bag to apply pressure to said mandrels and portions of said plies;
heating the vacuum bag, said dome shaped recessed male mold, said mandrels and said plies in an autoclave to at least partially cure the resin in said plies to form a core;
locating the formed outer skin within a female mold;
applying adhesive to the formed core;
positioning the formed core against the formed outer skin within the female mold;
placing the female mold, the formed outer skin and the formed core in a vacuum bag to apply pressure to the formed core;
applying adhesive to the formed core;
positioning the formed inner skin against the core within the female mold;
placing the female mold, the formed outer skin, the formed core and the formed inner skin in a vacuum bag to apply pressure to the formed inner skin; and
removing the formed outer skin, the formed core and the formed inner skin from the female mold.

11. The method set forth in claim 10, wherein the mandrels are made of silicone rubber.

12. The method set forth in claim 10, comprising the further and separate steps of forming an edge band and a drain cap from plies of resin impregnated glass cloth, applying adhesive to the edge band following the placing of the female mold, the formed outer skin and the formed core in a vacuum bag to apply pressure to the formed core, positioning the edge band against the formed outer skin adjacent the formed core, placing the female mold, the formed outer skin, the formed core and the edge band in a vacuum bag to apply pressure to the edge band, cutting a slot in the formed core following formation of the formed core, applying adhesive to the drain cap, positioning the drain cap against the formed core and over the slot in the formed core, and applying pressure to the drain cap to hold it against the formed core.

13. The method of making a rigid structural member from cloth impregnated with a thermosetting compound comprising the steps of:
providing a dome shape male mold having a plurality of recesses therein;
placing at least one piece of cloth impregnated with a thermosetting compound on said dome shaped male mold and within the recesses;
providing a plurality of rubber mandrels having shapes similar to the recesses in said dome shaped male mold;
placing the rubber mandrels within the recesses in said dome shaped male mold and on the piece of cloth within the recesses;
applying pressure to the rubber mandrels;
heating the cloth and the rubber mandrels during the application of pressure to the rubber mandrels to at least partially cure the thermosetting compound in the cloth;
terminating the heating and the application of pressure;
removing the rubber mandrels from said dome shaped male mold; and
removing the cloth from the mold.

14. The method set forth in claim 13, wherein the cloth is comprised of glass and is impregnated with a thermosetting resin.

15. The method set forth in claim 13, wherein the step of placing at least one piece comprises placing a plurality of different pieces of the cloth on the mold in overlapping fashion.

16. The method set forth in claim 13, wherein the step of applying pressure is carried out using a vacuum bag which surrounds said dome shaped male mold, the impregnated cloth and the rubber mandrels, and the step of heating is carried out in an autoclave into which the vacuum bag containing said dome shaped male mold, the impregnated cloth and the rubber mandrels is placed.

* * * * *

UNITED STATES PATENT AND TRADEMARK OFFICE
CERTIFICATE OF CORRECTION

PATENT NO. : 4,620,890
DATED : November 4, 1986
INVENTOR(S) : Donald H. Myers et al It is certified that error appears in the above-identified patent and that said Letters Patent are hereby corrected as shown below:

Column 4, line 32, "resih" should read --resin--. Column 9, line 63, "mole" should read --mold--. Column 10, line 4, "shape" should read --shaped--;

Column 10, line 19, strike "by" (second occurrence); line 5_, "shape" should read --shaped--; line 63, after "shaped" and before "mold" insert --male--. Column 11, line 2, "th" should read --the--; line 24, "shape" should read --shaped--; line 25, after "to" (second occurrence) and before "plies" strike "the" and insert --said--; line 26, after "bag," and before "mold" strike "the" and insert --said dome shaped male-- and after "and" and before "plies" strike "the" and insert --said--. Column 12, line 22, "shape" should read --shaped--.

Signed and Sealed this

Twenty-fourth Day of March, 1987

Attest:

DONALD J. QUIGG

Attesting Officer

Commissioner of Patents and Trademarks